United States Patent Office.

GUSTAVE FRERET, OF NEW YORK, N. Y., ASSIGNOR TO THE J. C. WITTER COMPANY, OF SAME PLACE.

PROCESS OF MAKING PLASTER-OF-PARIS CASTS OR FORMS FROM MOLDS.

SPECIFICATION forming part of Letters Patent No. 612,626, dated October 18, 1898.

Application filed August 19, 1896. Serial No. 603,256. (No specimens.)

*To all whom it may concern:*

Be it known that I, GUSTAVE FRERET, a subject of the Queen of Great Britain, residing at the city of New York, in the county and State of New York, have invented certain new and useful Improvements in Processes of Making Plaster-of-Paris Casts or Forms from Molds; and I do hereby declare that the following is a full, clear, and exact description of the invention, which will enable others skilled in the art to which it appertains to use the same.

Plaster casts made by any of the processes heretofore known or in use were fragile and easily dented, chipped, or broken.

The object of my invention is to make casts or forms which shall consist, essentially, of plaster-of-paris and of which the exterior shall be pure plaster-of-paris, so that the casts shall have all of the exterior qualities of ordinary plaster-of-paris casts, but shall be harder and tougher, so as not to be easily dented, chipped, cracked, or broken, being at the same time thinner and lighter than would be possible in making ordinary plaster-of-paris casts; and to this end my invention consists in making the cast with an exterior coating of pure plaster-of-paris with inner layers of some open-textured fabric applied and fastened with a mixture of plaster-of-paris, glue, and alum with an interior coating of pure plaster-of-paris.

To carry my invention into effect, I make the casts in plaster-of-paris molds which are seasoned as in the case of making ordinary plaster casts. I apply to the surface of the mold a thin layer of clear plaster-of-paris mixed with water to a thin batter-like consistency, rubbing the plaster thoroughly into all of the recesses and crevices of the mold with an ordinary hog's-bristle brush. I then make a mixture of glue, alum, and plaster-of-paris of a thick batter-like consistency in the following manner: I prepare a mixture of glue and water by dissolving two ounces of glue in one pint of water and make a mixture of alum and water by dissolving two ounces of alum in one pint of water. I then take a common teacupful of water and put into it a teaspoonful of the prepared mixture of alum and water and a half-teaspoonful of the prepared mixture of glue and water, mixing all thoroughly together by agitation. I then take a little of this mixture and mix enough plaster-of-paris with it to make a batter-like mass, and this I test in water to ascertain how long it requires to set. To obtain the best results, the mixture of alum, glue, plaster-of-paris, and water should set in about ten minutes, this time being slightly varied according to the work to be done. If the small quantity mixed for testing purposes sets too quickly, I add enough of the prepared glue and water to the cupful of alum, glue, and water to retard the setting to the required length of time. If it does not set rapidly enough, I add enough of the prepared alum and water to make it set within the desired time. Thus having obtained the right mixture of alum, glue, and water, I mix enough plaster-of-paris with the cupful of alum, glue, and water to make a thick batter-like mass. I then take some thin open-textured fabric, preferably an open-textured scrim, and cut it up into pieces of a size and shape convenient for laying in the mold over the surface of the plaster-of-paris already applied with the brush. I then lay in pieces of the scrim dry upon the plaster-of-paris surface and with the brush apply to them a coating of the batter-like mixture, which fastens them firmly to the plaster-of-paris surface already applied. I lay the scrim in in two or three or more layers, as the case may require, and rub each layer down thoroughly and work it thoroughly into all the crevices and recesses of the mold, and I work the mixture thoroughly into the scrim itself, so that the interior of the mold is covered with two or three or more layers of the scrim so applied. I lay in the scrim so that the threads of the different layers run in different directions and so that it projects slightly above the edges of each half of the mold. I then take a mixture of plaster-of-paris and water, such as is used in making ordinary plaster casts, and with a spatula apply about one-quarter of an inch, more or less, as the case may need, to the interior of the mold as already prepared. With a spatula I then rub off the edges of the mold, so that the projecting scrim and plaster are forced back pretty nearly to a level with the edge of the mold, and I then fasten together the halves of the mold in the ordinary fashion until the two pieces are brought solidly together, and when the whole is set I finish as in the case of ordinary plaster casts.

The application of the first coat of plaster with the brush insures that the cast shall show every line and crack in the mold and gives the cast when made the appearance of an ordinary plaster cast. The application of the scrim or other open-textured fabric made back of this first coat of plaster (which ordinarily should be less than one-sixteenth of an inch thick) with a mixture of alum, glue, plaster-of-paris, and water hardens this exterior surface to a bone-like consistency and also forms a hard, bone-like, and very tough backing for the exterior coat, which backing sets sufficiently slow by reason of the addition of the glue to enable the operator to properly perform the operation and is made hard enough to resist any ordinarily hard knock by the addition of the glue and alum. The scrim applied in the layers laid on so that the threads cross each other further adds to the toughness of this backing. The inside coating or backing of plaster-of-paris, which sets rapidly, swells as it sets and has the effect of forcing the mixture into every crevice and line of the mold and also of forcing solidly together the projecting edges of the layers of scrim, so that they form a joint as tough as the rest of the mold.

In the case of ordinary plaster casts the whole cast is very fragile and any small projection is broken off with the slightest blow. My method of casting protects the entire face of the cast, including all small projections, by having scrim backing applied, as described, near the face of the cast. It is not essential to my process that the first coat or the scrim coat should be applied with a brush, but the best results are produced in that way. Salt may be used instead of alum, but with less satisfactory results.

Having fully described my invention, what I claim, and desire to secure by Letters Patent, is—

1. The process of making plaster casts from molds consisting in applying to the surface of the mold a thin layer of quick-setting plaster, then applying thereto dry open-textured fabric and a coating of slow-setting plaster, and then applying a backing of quick-setting plaster and permitting it to swell and force the fabric and its coating and the first layer together.

2. The process of making plaster casts from molds consisting in applying to the surface of the mold a thin layer of quick-setting plaster, then applying thereto a plurality of pieces of open-textured fabric with their threads crossing each other and securing said pieces by a coating of slow-setting plaster, and then applying a backing of quick-setting plaster.

3. A plaster cast composed of an outer thin surface of plaster, a plurality of overlapping pieces of open-textured fabric, and a relatively thick backing of plaster.

4. A plaster cast composed of an outer thin surface of plaster and a relatively thick backing of plaster, and an interposed layer composed of a plurality of pieces of open-textured fabric having their threads crossing each other.

5. A plaster cast composed of an outer thin surface of plaster and a relatively thick backing of plaster, and an interposed layer composed of a plurality of pieces of open-textured fabric having their threads crossing each other, the said pieces of fabric being embedded in a mixture of plaster, glue and alum.

6. A plaster cast composed of two parts each consisting of two thicknesses of plaster and an interposed layer of open-textured fabric projecting from the edges of the halves, the said halves being joined together and having the joint strengthened by the said projecting threads of fabric.

Dated August 17, 1896.

GUSTAVE FRERET.

Witnesses:
 WM. J. DALTON,
 FREDERIC S. ALLEN.